Patented Feb. 20, 1934

1,947,747

UNITED STATES PATENT OFFICE 1,947,747

PROCESS FOR WATER PURIFICATION

Oliver M. Urbain, Columbus, Ohio, assignor to Charles H. Lewis, Harpster, Ohio

No Drawing. Application February 17, 1933
Serial No. 657,313

8 Claims. (Cl. 210—2)

The invention relates to a process of water purification. More specifically, the invention contemplates the provision of a process for the removal of polluting alcohols and amines from water.

The alcohol and amines have substantial biochemical oxygen demands, and it is imperative that they be removed from waste in which they are found. The source of the alcohols in these wastes originates with the carbohydrates and are formed in the waste as a result of the fermentation of the carbohydrates. Therefore, one will find the alcohols in distiller's waste, the waste from canneries, sugar refineries, and the like. The content of alcohols in these wastes will vary from about 10 ppm. in municipal sewage to as high as 2,000 ppm. in wastes from canneries when canning such vegetables as sweet corn.

As the amines are the decomposition product of all protein matter, whether vegetable or animal, amines are found in all wastes which contain protein matter in a state of putrefaction, and the amount of the amines present will depend upon the amount of protein originally present in the waste and also upon the extent to which putrefaction has progressed. The amount of amines found in the various wastes will vary from about 50 ppm. in municipal sewage to as high as 5,000 ppm. in thoroughly putrefied waste from packing houses. Amines are always present in the waste issuing from municipalities, creameries, cheese factories, tanneries, canneries, and the like.

In some of these wastes, for instance, those from packing houses in a high state of putrefaction, as high as 95% of the biochemical oxygen demand is due to their content of amines. It is thus seen that the removal of amines is of great importance in the purification of polluted water.

According to the process of the present invention, the mono acid halides of diabasic acids and the acid halides of polybasic acids are caused to react with the alcohols and amines to form insoluble compounds at a pH of 9.0 or over.

The process embraces changing the alcohols and amines by hooking onto the molecules of alcohols and amines an acid group, and then reacting with the product of these reactions with calcium hydroxide or barium hydroxide at a pH 9.0 or over.

Exemplary reagents for use in this process are,—

(1) Adipsyl chloride
(2) Succinyl chloride
(3) Chlorosulfonic acid
(4) Phthalyl chloride (They are numbered in the order of their preference.)

After attaching an acid group onto the alcohols and amines, the products of this reaction tend to hydrolyze and revert to the original alcohols and amines. As an halogen acid is also a product of these reactions, it becomes apparent that if, for no other reason, the reaction should take place in an alkaline medium. But, in order to form insoluble compounds and facilitate their removal by sedimentation, as well as to prevent hydrolysis of the first products of the reaction, it is necessary that the reaction be carried one step further. I employ either calcium hydroxide or barium hydroxide, preferably the former, to form with the first products of the reaction insoluble compounds.

The pH of the medium during the latter stages of the reaction must be 9.0 or over. Examples of the first part of the general reactions using a mono acid chloride of terephthalic acid and the alcohols and amines, are as follows:—

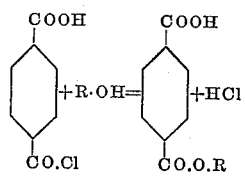

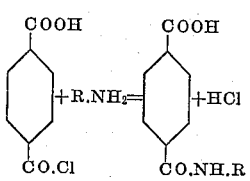

What actually takes place in these reactions is that there is hooked into the molecules of the alcohols and amines an acid residue thus providing means for reaction with an alkali. The products to the right are unstable, due to their tendency to hydrolyze, and the reaction must be carried further in the presence of calcium hydroxide.

R in the formulas above represents any hydrocarbon radical or substituted hydrocarbon radical.

Examples of the first step of the reaction using an acid halide of a polybasic acid and the alcohols and amines are as follows:—

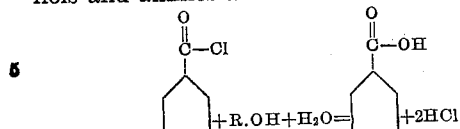

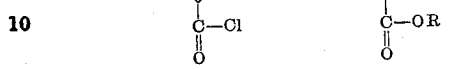

As in the preceding reactions the products of these reactions also tend to hydrolyze and, in order to get insoluble compounds, it is again necessary that the reactions take place in an alkaline medium of calcium hydroxide having a pH of 9.0 or over. In all four of the examples, in the second part of the reaction, the calcium hydroxide reacts with the products of the above reaction and also neutralizes the hydrochloric acid.

Examples of the complete reactions using the mono acid chloride of terephthalic acid are as follows:—

The general reaction for the alcohols is as follows:—

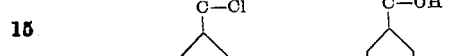

The general reaction for the amines is as follows:

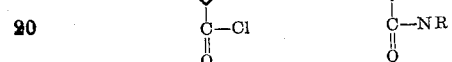

The calcium salts formed in the above reaction are very insoluble compounds and readily precipitate and settle from the solution. The reaction is very fast and complete. The reagents are added in gram molecular equivalents with sufficient excess calcium hydroxide to maintain the pH of the solution at 9.0 or over.

Examples of the general reactions showing the reactions between an acid halide of a polybasic acid and (a) the alcohols and (b) the amines are as follows:—

(a) The reaction with the alcohols is as follows:—

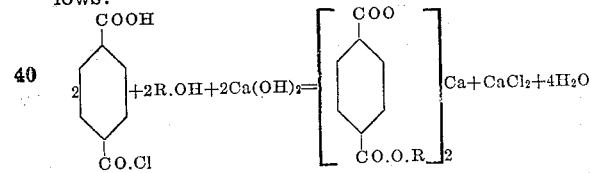

(b) The reaction with the amines is as follows:

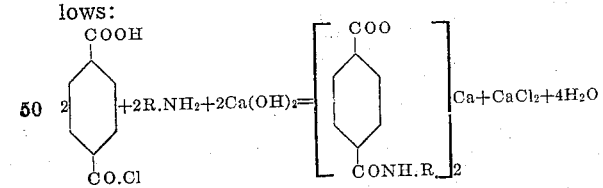

As in the preceding reactions there is again obtained calcium compounds which settle rapidly. The reactions are complete and fast.

The best procedure to follow in the practice of this process is to determine first the total quantity of alcohols present and the total quantity of amines present and add the reagent in gram molecular equivalents, adding simultaneously sufficient hydrate of calcium to take part in the reaction and maintain the pH at 9.0 or over. Upon the addition of the reagents the solution should be agitated for a period of about five minutes. A coagulant may be used. When a coagulant is used it may be introduced following the five minute period of agitation and the solution again agitated for approximately one minute.

Having thus described my invention what I claim is:—

1. A process of water purification comprising treating a polluted water containing alcohols and amines with a mono acid halide of a diabasic acid in at least gram molecular equivalents to the alcohols and amines present.

2. A process of water purification comprising treating a polluted water containing alcohols with a mono acid halide of a diabasic acid in at least gram molecular equivalents to the alcohols present.

3. A process of water purification comprising treating a polluted water containing amines with a mono acid halide of a diabasic acid in at least gram molecular equivalents to the amines present.

4. A process of water purification comprising treating a polluted water containing alcohols and amines with an acid halide of a polybasic acid in at least gram molecular equivalents to the alcohols and amines present.

5. A process of water purification comprising treating a polluted water containing alcohols with an acid halide of a polybasic acid in at least gram molecular equivalents to the alcohols present.

6. A process of water purification comprising treating a polluted water containing amines with an acid halide of a polybasic acid in at least gram molecular equivalents to the amines present.

7. A process of water purification comprising treating a polluted water containing alcohols and amines with a mono acid halide of a diabasic acid in at least gram molecular equivalents to the alcohols and amines present, and maintaining the solution at a pH of 9.

8. A process of water purification comprising treating a polluted water containing alcohols and amines with an acid halide of a polybasic acid of the group including adipsyl chloride, succinyl chloride, chlorosulfonic acid, and phthalyl chloride in at least gram molecular equivalents to the alcohols and amines present.

OLIVER M. URBAIN.